(12) United States Patent
Kusakabe (10) Patent No.: US 10,230,857 B2
(45) Date of Patent: Mar. 12, 2019

(54) IMAGE FORMING APPARATUS HAVING CONTROLLED CONVEYANCE SPEED, IMAGE FORMING METHOD, AND STORAGE MEDIUM

(71) Applicant: CANON KABUSHIKI KAISHA, Tokyo (JP)

(72) Inventor: Taketoshi Kusakabe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/597,836

(22) Filed: May 17, 2017

(65) Prior Publication Data
US 2017/0346973 A1 Nov. 30, 2017

(30) Foreign Application Priority Data

May 30, 2016 (JP) .................................. 2016-107361

(51) Int. Cl.
*H04N 1/00* (2006.01)

(52) U.S. Cl.
CPC ..... *H04N 1/00649* (2013.01); *H04N 1/00037* (2013.01); *H04N 1/00408* (2013.01); *H04N 1/00602* (2013.01); *H04N 1/00604* (2013.01); *H04N 2201/0094* (2013.01)

(58) Field of Classification Search
None
See application file for complete search history.

(56) References Cited

U.S. PATENT DOCUMENTS

| 8,351,056 B2 * | 1/2013 | Shimura | G03G 15/607 358/1.12 |
| 9,183,472 B2 * | 11/2015 | Kusakabe | G06K 15/1805 |
| 2006/0092479 A1 * | 5/2006 | Dohi | G06F 3/1214 358/452 |

(Continued)

FOREIGN PATENT DOCUMENTS

JP 2005-85210 3/2005

OTHER PUBLICATIONS

U.S. Appl. No. 15/597,799, filed May 17, 2017 by Sho Nakamura et al.
U.S. Appl. No. 15/597,821, filed May 17, 2017 by Norio Shimura.

*Primary Examiner* — Chad Dickerson
*Assistant Examiner* — Pawandeep Dhingra
(74) *Attorney, Agent, or Firm* — Venable LLP (57) ABSTRACT

An image forming apparatus conveys a printing medium at a first conveyance speed when a number of copies to be printed is smaller than a predetermined number, and conveys the printing medium at a larger second conveyance speed when the number of copies to be printed is larger than the predetermined number. When the numbers of copies to be printed of the first and second print jobs are smaller than the predetermined number, and printing mediums to be used for a first print job and a second print job are conveyed at the first conveyance speed, or when the numbers of copies to be printed of the first and second print jobs are larger than the predetermined number, and the printing mediums to be used for the first and second print job are conveyed at the second conveyance speed, continuous printing of the first and second print jobs is possible.

15 Claims, 8 Drawing Sheets

(56) References Cited

U.S. PATENT DOCUMENTS

| | | | |
|---|---|---|---|
| 2009/0317120 A1* | 12/2009 | Miyahara | G03G 15/234 |
| | | | 399/82 |
| 2012/0020716 A1* | 1/2012 | Hashimoto | B41J 13/0009 |
| | | | 400/582 |
| 2013/0229684 A1* | 9/2013 | Yasuzaki | H04N 1/00127 |
| | | | 358/1.15 |
| 2015/0085310 A1 | 3/2015 | Yasuzaki | |
| 2015/0189103 A1 | 7/2015 | Yasuzaki | |

* cited by examiner

IMAGE FORMING APPARATUS HAVING CONTROLLED CONVEYANCE SPEED, IMAGE FORMING METHOD, AND STORAGE MEDIUM

BACKGROUND OF THE INVENTION

Field of the Invention

The present invention relates to an image forming apparatus that receives print setting information and print data transmitted by an external device and forms an image based on the received print setting information and print data, an image forming method, and a storage medium.

Description of the Related Art

Conventionally, as a technique that is applied to a commercial high-speed printer, a technique is known which conveys a cut sheet fed from a sheet feed unit by causing the next cut sheet to follow the preceding cut sheet. With this technique, it is possible to shorten the time taken to print a plurality of pages compared to the method in which a sheet for the next page is fed after discharge of the sheet for the previous page is completed. In the present specification, performing a series of operations to feed a sheet, to perform printing, and to discharge a sheet in parallel as described above is referred to as continuous printing.

The continuous printing is also applied at the time of printing a plurality of print jobs (print job includes print data described in PDL and print setting information). That is, in the case where the print settings (including, for example, sheet size, sheet type and the like) of two successive print jobs are the same, printing is performed in the continuous printing without suspending sheet feed at the boundary between the print job and the next print job. Japanese Patent Laid-Open No. 2005-85210 has disclosed that a connection job is produced by connecting a plurality of print jobs and printing processing is performed for the produced connection job.

SUMMARY OF THE INVENTION

The technique described in Japanese Patent Laid-Open No. 2005-85210 does not take into consideration the case where the first print job includes an odd number of pages and both-side printing is performed at the time of performing the continuous printing of a plurality of print jobs. That is, in the case where the continuous printing is performed with the both-side printing setting for the first print job including an odd number of pages and the second print job, the last page of the first print job is printed on the surface of the sheet. In the case where the page of the second print job is printed on the backside of this sheet, there is a possibility that printed matter not intended by a user is printed. Consequently, an object of the present invention is to output printed matter faithfully reflecting the intention of a user in an image forming apparatus capable of continuous printing of a plurality of print jobs.

The present invention is an image forming apparatus that forms an image based on print data and print setting information included in a print job and includes: a printing determination unit configured to determine whether or not continuous printing is possible, in which a printing medium to be used for printing of a second print job is fed to a conveyance path before discharge of printed matter of a first print job is completed, based on the first print job and the second print job received after the first print job; a determination unit configured to determine, in a case where it is determined that the continuous printing is possible, whether the first print job includes an odd number of pages and both-side printing is set to the first print job and the second print job, respectively; and a control unit configured to perform, in a case where the first print job includes an odd-number of pages and both-side printing is set to the first print job and the second print job, respectively, control so as to insert a blank page so that the first page of the second print job is not printed on the opposite side of the last page of the first print job.

Further features of the present invention will become apparent from the following description of exemplary embodiments with reference to the attached drawings.

BRIEF DESCRIPTION OF THE DRAWINGS

FIG. 5 consisting of FIG. 5A and FIG. 5B is a flowchart of processing to determine whether continuous printing is possible in the first embodiment;

DESCRIPTION OF THE EMBODIMENTS

In the following, with reference to the drawings, preferred embodiments of the present invention are explained as examples. However, the relative arrangement of the components, the shapes of devices and the like described in the following are merely exemplary and are not intended to limit the scope of the present invention only to those. It should be understood that those obtained by appropriately modifying and improving the embodiments described below based on the common knowledge of a person in the art within the scope not deviating from its gist fall within the scope of the present invention. In the present specification, it is assumed that the "image forming apparatus" includes a multi function peripheral that combines a print function and other functions, a manufacturing device that forms an image or a pattern on a printing medium and the like, not limited to a dedicated machine specialized in the print function.

First Embodiment (About Configuration of Image Forming Apparatus)

Figure 1:
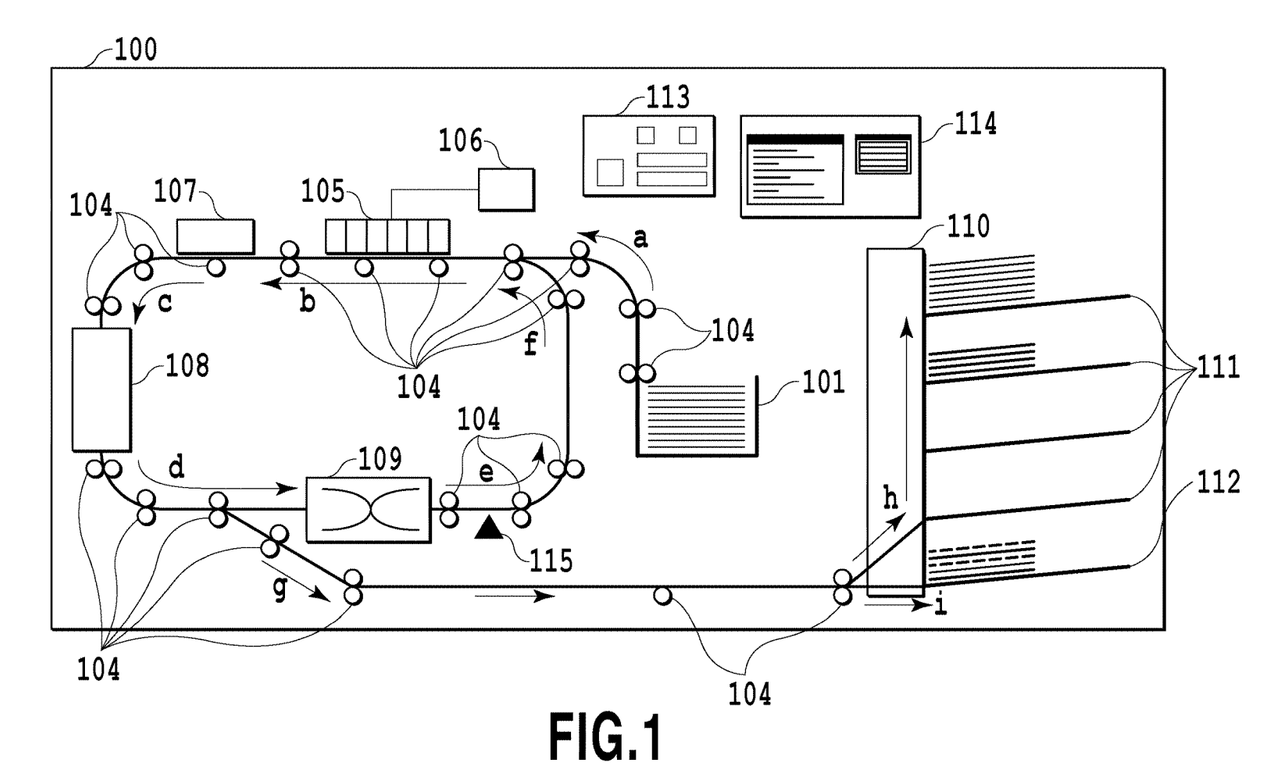
FIG. 1 is a cross section diagram of an image forming apparatus in a first embodiment.

FIG. 1 is a cross section diagram showing the entire configuration of an image forming apparatus 100 for performing printing on a cut sheet (sheet whose size has been cut to a predetermined size, such as L size, A4, A3 and the like) in the present embodiment. The image forming apparatus 100 includes a sheet feed tray 101, a rotary roller 104 to convey a sheet to a predetermined location, a print head 105, and an ink tank 106. The image forming apparatus in the present embodiment is compatible with printing of cut sheets of a variety of sheet sizes and sheet types, but for simplicity, in FIG. 1, only one sheet feed tray is shown. In the one sheet feed tray, a plurality of the same cut sheets (the sheet size is the same and the sheet type is the same) is set. The image forming apparatus 100 further includes a scanner unit 107, a drying unit 108, a reversion unit 109, a sort unit 110, a control unit 113, and an operation unit 114. The control unit 113 is a unit including a controller made up of a CPU, a ROM, a RAM and the like, and various I/O interfaces and governs control of the entire image forming apparatus 100.

A sheet pulled out of the sheet feed tray 101 advances in the direction of an arrow a in FIG. 1 by the rotary roller 104 driven by motor control and then advances in the direction of an arrow b and passes under the print head 105.

In the print head 105, independent ink jet heads corresponding to a plurality of colors (in the present embodiment, six colors) are held along the sheet conveyance direction. Ink is ejected from the print head 105 in synchronization with the conveyance of the sheet, and thereby, an image is formed on the sheet.

The ink tank 106 stores ink in each color independently. The print head 105 and the ink tank 106 are connected by a tube and to each ink jet head of the print head 105, a color ink corresponding to each ink jet head is supplied from the ink tank 106 via the tube. The ink tank 106 and the tube exist for each color, but for simplicity, in FIG. 1, only one ink tank and only one tube are shown.

In the print head 105, line heads in respective colors (in the present embodiment, six colors) are put side by side along the conveyance direction (direction of the arrow b) at the time of printing. Each color line head may be one formed by a single nozzle chip seamlessly, or one in which divided nozzle chips are regularly put side by side in a one-line array or in a staggered array. The print head 105 in the present embodiment is a so-called full multi-head in which nozzles are put side by side in the range that covers the width of the maximum size sheet that the image forming apparatus 100 can print. The ink jet scheme in which ink is ejected from a nozzle can employ a scheme that uses heat-generating elements, a scheme that uses piezo elements, a scheme that uses electrostatic elements, a scheme that uses MEMS elements and the like. Based on print data, ink is ejected from the nozzle of each ink jet head. The present invention is not limited to an ink jet printer and can be applied to a variety of printing-scheme printers, such as a thermal printer (dye-sublimation printer, thermal transfer printer and the like), a dot impact printer, an LED printer, and a laser printer.

A sheet on which an image is formed by the print head 105 is conveyed up to the scanner unit 107 by the rotary roller 104. By the scanner unit 107 reading an image and a special pattern printed on the sheet, it is made possible to determine whether or not there is a problem in the printed image, or to determine the state of the image forming apparatus, such as an out-of-ink state. Further, it is possible for the scanner unit 107 to read the state of the backside facing the printed side and to detect a deviation in the printing position between the surface and the backside by using a predetermined pattern.

The sheet scanned by the scanner unit 107 advances in the direction of an arrow c by the rotary roller 104 and is conveyed to the drying unit 108. The drying unit 108 is a unit configured to apply heat to a sheet passing through the inside thereof with warm air in order to dry a sheet to which ink is attached in a short time.

Among the sheets having passed through the drying unit 108, the sheet for which image formation has not been completed advances in the direction of an arrow d and is conveyed to the reversion unit 109. The reversion unit 109 reverses the surface and the backside of the sheet passing through the inside thereof. As the method of reversing a sheet, there are a switch back method, a method of slowly twisting the conveyance path and the like, but while the switchback method requires to temporarily suspend the movement of a sheet, the method of switching the conveyance path can keep the conveyance speed constant, and therefore, is appropriate for high-speed printing.

The sheet having passed through the reversion unit 109 advances in the direction of an arrow e and at this point of time, the state where the surface and the backside are reversed is brought about. After this, the sheet advances in the direction of an arrow f and passes again under the print head 105 in which the ink jet heads are put side by side.

As described above, the path indicated by the arrows b, c, d, e, and f in this order in FIG. 1 is a path along which a sheet circulates and each time a sheet circulates the path, the surface and the backside are reversed. The number of sheets that can exist simultaneously on this circulation path is referred to as the number of circulatable sheets in the present specification. The number of circulatable sheets changes depending on the sheet size. For example, that the number of circulatable sheets of A3 size is three means that it is possible to convey up to three sheets of A3 size (including the sheet for which printing has not been performed yet and the sheet for which printing has already been performed) at the same time on the path.

On the other hand, among the sheets having passed through the drying unit 108, the sheet for which printing has been completed advances in the direction of an arrow g without passing through the reversion unit 109 and is conveyed to the sort unit 110. That is, in the case of one-side printing, the sheet advances in the direction of the arrow g at the branch point on the way of the first circulation of the circulation path and in the case of both-side printing, the sheet advances in the direction of the arrow g at the branch point on the way of the second circulation of the circulation path. The sort unit 110 accumulates the sheet on a sheet discharge tray 111 corresponding to a tray number set for each printed image while checking the printed image by a sensor.

The sort unit 110 selects a tray on which sheets are accumulated in accordance with the setting of sheet discharge for each job or for each copy from a plurality of trays (in the present embodiment, five trays). The sort unit 110 in the present embodiment includes the four sheet discharge trays 111 for discharging a sheet for which printing has been completed successfully and a sheet disposal tray 112 for disposing of a sheet used for maintenance and the like. Among the sheets sorted by the sort unit 110, the sheet that advances in the direction of an arrow h is conveyed to the sheet discharge tray 111 and the sheet that advances in the direction of an arrow i is conveyed to the sheet disposal tray 112.

The operation unit 114 is a unit configured for a user to check which tray printed matter is accumulated on for the print job instructed to be printed, and to check a printing situation for each job, such as a printing standby situation, a printing-in-progress situation, a printing completed situation, and a situation in which an error has occurred. Further, it is possible for a user to check the state of the image forming apparatus 100 including the ink remaining amount, the number of remaining sheets, whether head cleaning is necessary and the like via the operation unit 114 and a user performs maintenance, such as head cleaning, in accordance with the necessity. The operation unit 114 includes, for example, a display, a mouse and the like.

A sheet sensor 115 determines whether or not a sheet within the path has reached the position of the sheet sensor 115. It may also be possible to perform control so that the number of sheets circulating within the path does not exceed the number of circulatable sheets by prohibiting sheet feed from the sheet feed tray 101 until the rear end of the sheet passes the position of the sheet sensor 115 in the case where the tip end of the sheet that circulates the path has reached the position of the sheet sensor 115. It is possible to arrange a plurality of the sheet sensors 115 and it is possible to change the position of the sensor used for determination depending on the size of a sheet for which printing is performed and the conveyance speed.

(About Hardware Configuration of Image Forming Apparatus)

Figure 7:
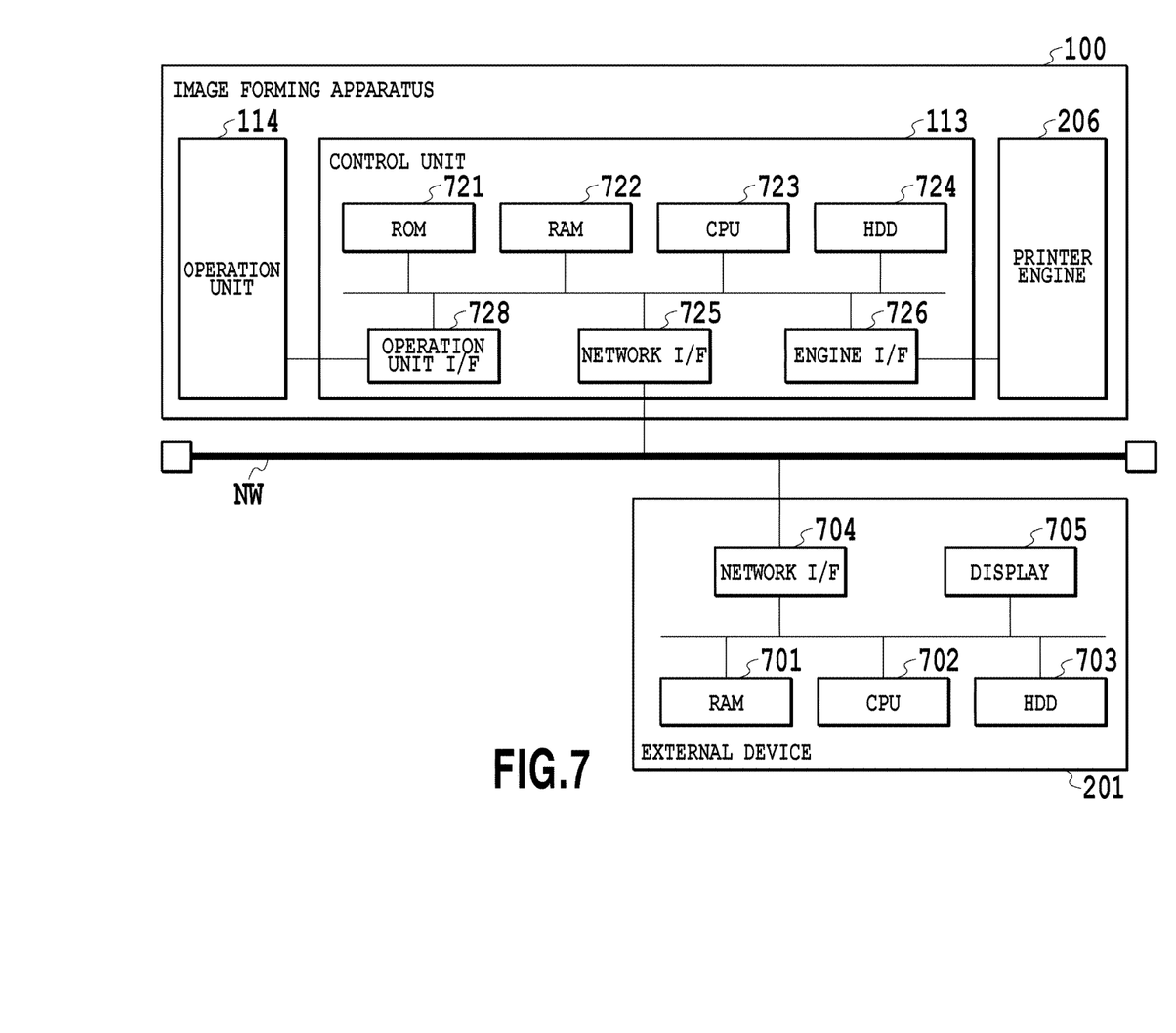
FIG. 7 is a hardware configuration diagram of the image forming apparatus.

FIG. 7 is a diagram showing a hardware configuration of the image forming apparatus 100 and an external device 201 in the present embodiment. The image forming apparatus 100 of the present embodiment includes the control unit 113 configured to govern various kinds of control of the image forming apparatus 100, and a printer engine 206. Further, the control unit 113 includes a ROM 721, a RAM 722, a CPU 723, an HDD 724, a network I/F 725 ("I/F" means interface), an engine I/F 726, and an operation unit I/F 728. The printer engine 206 and the control unit 113 are connected via the engine I/F 726, and the printer engine 206 and the operation unit 114 are connected via the operation unit I/F 728, respectively. As will be described later, the image forming apparatus 100 and the external device 201 are connected also by a print data dedicated line, in addition to via a network I/F.

The ROM 721 is a nonvolatile memory and the programs of each function block of the image forming apparatus 100 are stored. The RAM 722 is a volatile memory and at the time of power on, the programs of each function block stored in the ROM 721 are developed. There is a case where the RAM 722 stores image data transmitted from the external device 201. Further, the RAM 722 serves as a primary storage area to store information that is read and written at a high speed in each function block. The CPU 723 is a calculation processor that executes the programs of each function block developed onto the RAM 722. The HDD 724 is a storage device capable of storing a large amount of information and serves as a secondary storage area to store image data and the like transmitted from the external device 201. The network I/F 725 performs communication with the external device 201 via a network NW. The engine I/F 726 outputs image data in a format dependent on the printer engine 206 to the printer engine 206. The printer engine 206 drives each unit shown in FIG. 1 and drives a sheet feed mechanism, such as the rotary roller 104, as well as printing an image on a sheet based on the image data and feeds a sheet from the sheet feed tray 101 to the conveyance path. The operation unit I/F 728 performs communication with the operation unit 114. The operation unit 114 is capable of receiving input instructions by a user operation as described above and also functions as a display unit configured to present the discharge destination tray of a sheet and the state of the image forming apparatus 100, such as the printing-in-progress state, the printing completed state, and the state where an error has occurred.

The external device 201 includes a RAM 701, a CPU 702, an HDD 703, a network I/F 704, and a display 705. The RAM 701 is a volatile memory and onto which the programs of each function block stored in the HDD 703 at the time of power on are developed. Further, the RAM 701 serves as a primary storage area to store information that is read and written at a high speed in each function block. The CPU 702 is a calculation processor that executes the programs of each function block developed onto the RAM 701. The HDD 703 is a storage device capable of storing a large amount of information and serves as a secondary storage area to store the programs of each function block and application data. The network I/F 704 performs communication with the image forming apparatus 100 and another information processing device (not shown schematically) via the network NW. The display 705 is capable of displaying an image to be printed by the image forming apparatus 100 as well as producing a screen display at the time of power on and activation of application.

The external device 201 of the present embodiment issues print data and print setting information to the image forming apparatus 100. Further, the external device 201 generates image data to be printed. Image data for printing is, for example, common bitmap data. It is possible for the external device 201 to generate intermediate data and the above-described bitmap data by receiving PDL data input by another information processing terminal (not shown schematically) and interpreting a drawing command of the PDL. That is, the external device 201 of the present embodiment plays a role of RIP (Raster Image Processing) in the printing system shown in FIG. 2.

Figure 2:
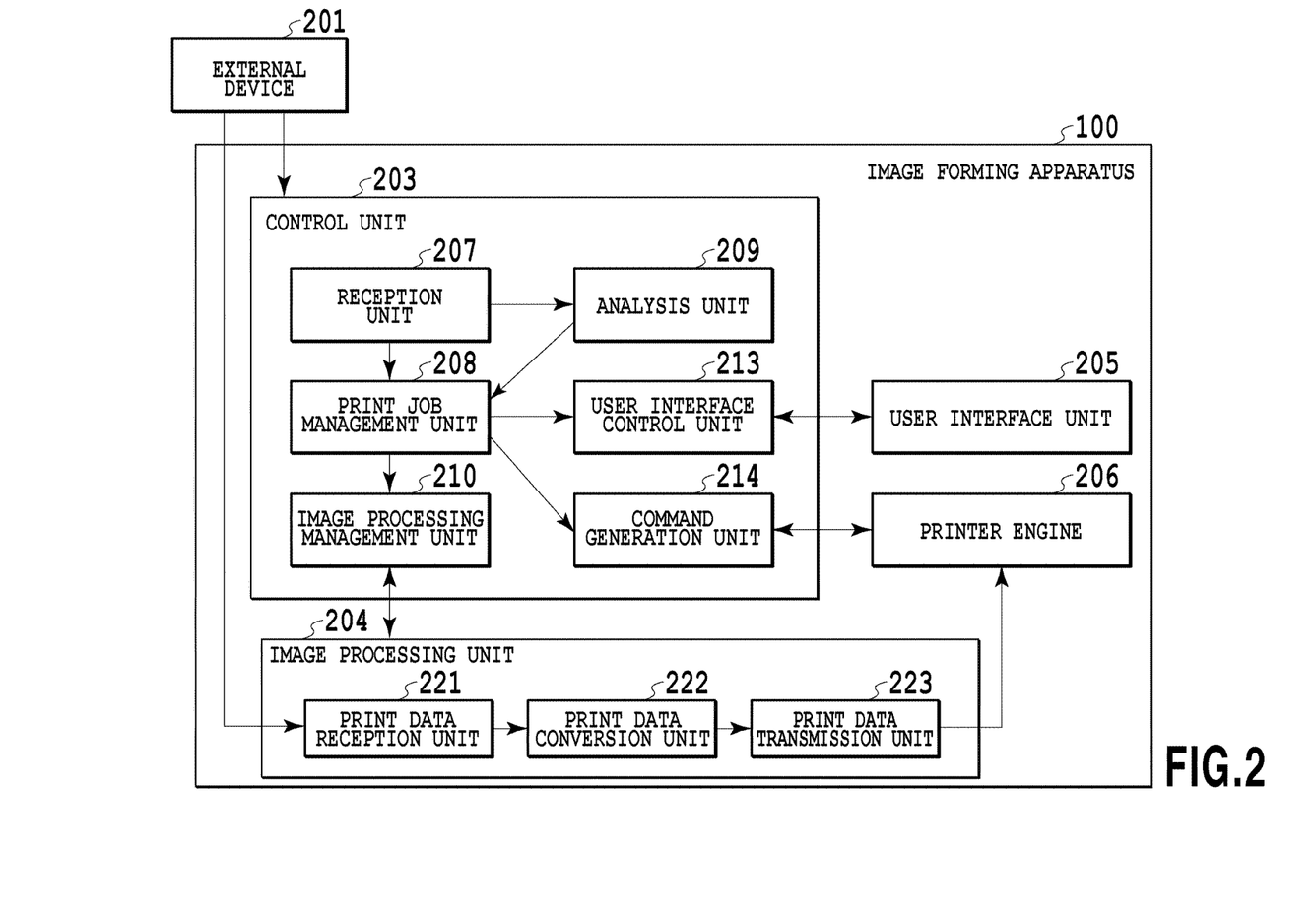
FIG. 2 is a block diagram of the image forming apparatus in the first embodiment.

FIG. 2 is a block diagram showing a function configuration of the image forming apparatus 100 in the present embodiment. The image forming apparatus 100 forms (prints) an image on a sheet based on print data and print setting information transmitted from the external device 201. The external device 201 is a high-spec PC or server mounting software for performing RIP processing and print job control processing and generally called a digital front end. The external device 201 receives a print job (including print data and print setting information) transmitted by an end user via a PC (not shown schematically) and first transmits the print setting information to a control unit 203. After this, the external device 201 transmits the print data to an image processing unit 204. The external device 201 generates bitmap data from the print data included in the print job received from the PC of a user and transmits the bitmap data to the image processing unit 204 as print data.

The control unit 203 generates data and a command to perform printing based on the print setting information transmitted by the external device 201 and instructions input by a user via a user interface unit 205. Details of the control unit 203 and the image processing unit 204 will be described later. The control unit 203 and the external device 201 are connected via a network.

The user interface unit 205 receives instructions from a user and presents information to a user by displaying a screen and issuing sound. The information presented to a user here includes the state of the image forming apparatus 100 and the printing situation for each print job.

The printer engine 206 forms an image on a sheet based on the print data transmitted from the image processing unit 204 and a control command transmitted from a command generation unit 214.

In the following, the control unit 203 is explained in detail. The control unit 203 includes a reception unit 207, a print job management unit 208, an analysis unit 209, an image processing management unit 210, a user interface control unit 213, and the command generation unit 214. The reception unit 207 receives print setting information from the external device 201 and stores the print setting information.

The print job management unit 208 manages a print job. Specifically, the print job management unit 208 instructs the command generation unit 214 to generate a control command for each page based on print setting information and to transmit the control commands to the printer engine 206 in a predetermined order.

The analysis unit 209 analyzes the print setting information and notifies the print job management unit 208 of the analyzed contents. This information includes processing contents for each page of the print job performed by the image processing unit 204.

The image processing management unit 210 instructs the image processing unit 204 to perform the following processing in accordance with instructions from the print job management unit 208. That is, the processing includes processing by a print data reception unit 221 to receive print data from the external device 201, processing by a print data conversion unit 222 to convert the received print data, and processing by a print data transmission unit 223 to transmit the converted print data to the printer engine 206. Further, the image processing management unit 210 manages an image processing situation of the image processing unit 204. For example, the image processing management unit 210 manages whether or not the image processing of the print data corresponding to a certain print job has been completed.

The command generation unit 214 generates a control command that can be interpreted by the printer engine 206 based on the print setting information and transmits the generated control command to the printer engine 206. The command generation unit 214 manages the image processing situation of the image processing unit 204 via the image processing management unit 210 and transmits completion instructions to the printer engine 206 in the case of determining that the image processing has been completed. It may also be possible for the printer engine 206 to acquire print data by accessing the image processing unit 204 upon receipt of the completion instructions.

In the following, the image processing unit 204 is explained in detail. The image processing unit 204 includes the print data reception unit 221, the print data conversion unit 222, and the print data transmission unit 223, and converts print data (bitmap data) received from the external device 201 into data dependent on the image forming apparatus 100. The print data received by the image processing unit 204 from the external device 201 is written to the print data reception unit 221. This print data is converted into data dependent on the image forming apparatus 100 in the print data conversion unit 222 and written to the print data transmission unit 223. After this, the print data transmission unit 223 transmits the print data converted in the print data conversion unit 222 to the printer engine 206. The image processing unit 204 and the external device 201 are connected by a dedicated data line.

The printer engine 206 performs printing processing based on the control command transmitted from the command generation unit 214 and the print data transmitted from the print data transmission unit 223.

The control unit 203 and the image processing unit 204 may be implemented by different CPUs. That is, the image forming apparatus 100 may include at least two CPUs and the first CPU may control the control unit 203 and the other CPU may control the image processing unit 204. In the case where a flowchart, to be described later, is performed in this situation, the processing of the control unit 203 is performed by the CPU corresponding to the control unit 203 and the processing of the image processing unit 204 is performed by the CPU corresponding to the image processing unit 204.

(About Printing Processing)

Figure 3:
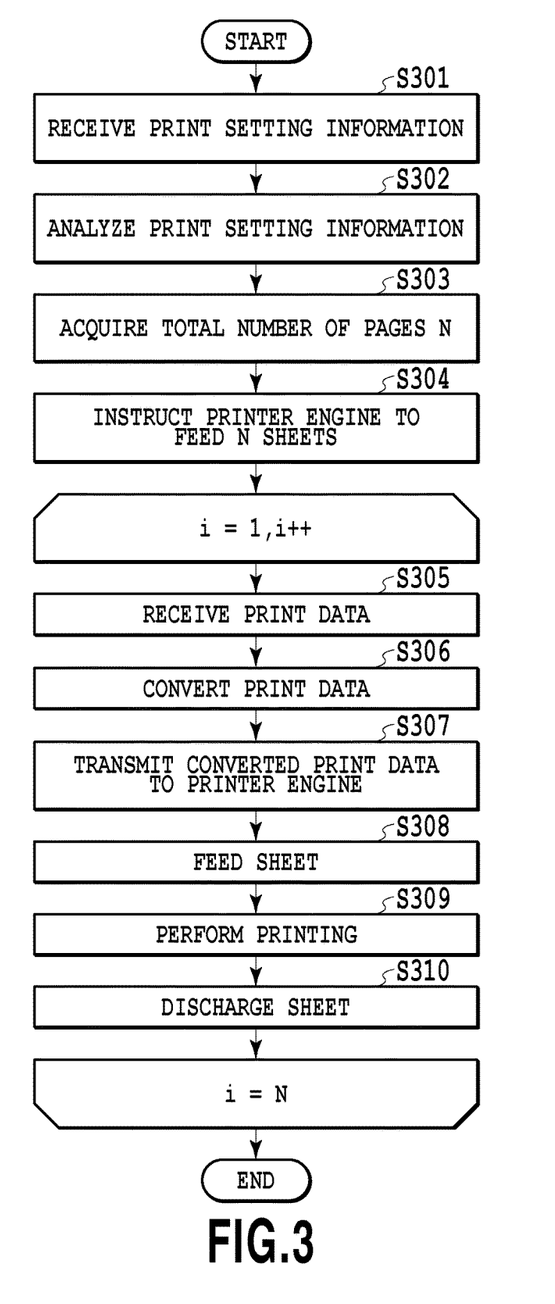
FIG. 3 is a flowchart of printing processing for one print job in the first embodiment.

FIG. 3 is a flowchart showing a flow of the printing processing for one print job. The flowchart of the present application is implemented by one or a plurality of CPUs included in the image forming apparatus reading a program relating to the flowchart from a memory and executing the program. At step S301, the reception unit 207 receives print setting information transmitted from the external device 201. At step S302, the analysis unit 209 analyzes the print setting information and acquires information relating to the print settings, such as the sheet type (plain sheet, glossy sheet and the like), the sheet size (A2, A3 and the like), the printing side (one-side, both-side), and the printing resolution. At step S303, the analysis unit 209 acquires a total number of pages N at the time of performing printing. At step S304, the print job management unit 208 instructs the printer engine 206 to feed N sheets via the command generation unit 214. Here, the case of one-side printing is explained. In the case of both-side printing, the value of N at S304 is half the total number of pages. In the case where the total number of pages is an odd number, the value of N is a value obtained by rounding up half the total number of pages to the next larger integer.

The processing at the subsequent step S305 to step 310 is repeated the number of times corresponding to the number of fed sheets (in the present embodiment, N times). At step S305, the print data reception unit 221 receives print data transmitted from the external device 201. At step S306, the print data conversion unit 222 converts the print data received at step S305 into print data dependent on the image forming apparatus 100. At step S307, the print data transmission unit 223 transmits the print data converted at step S306 to the printer engine 206. Upon the completion of the transmission of print data corresponding to one page, at step S308, the printer engine 206 feeds one sheet by controlling the sheet feed tray 101 and the rotary roller 104. At step S309, the printer engine 206 forms an image on the sheet based on the print data transmitted from the print data transmission unit 223. At step S310, the printer engine 206 discharges the sheet for which image formation has been completed to the sheet discharge tray 111 by controlling the rotary roller 104 and the sort unit 110.

Figure 4:
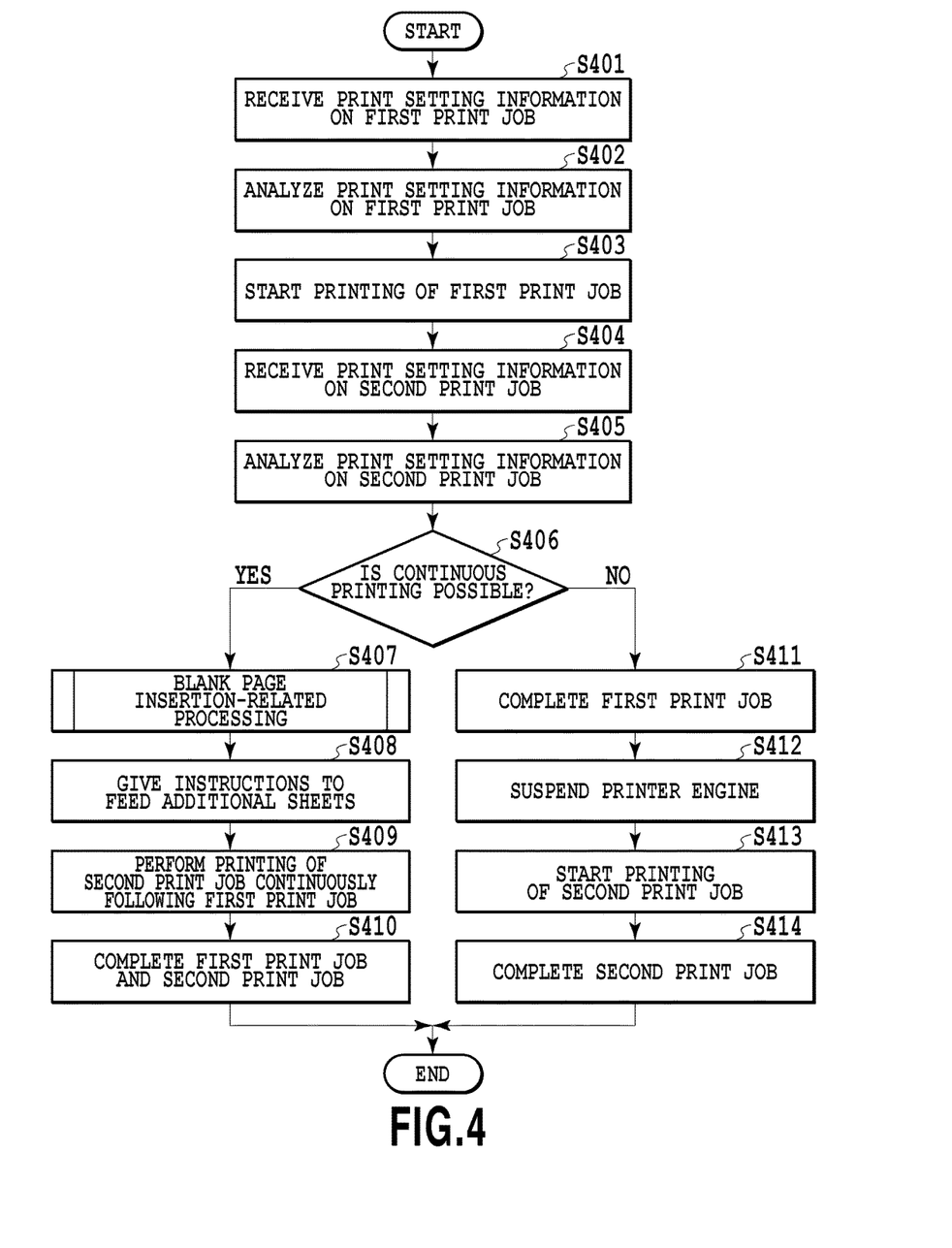
FIG. 4 is a flowchart of printing processing for a plurality of print jobs in the first embodiment.

FIG. 4 is a flowchart showing a flow of printing processing for a plurality of print jobs. At step S401, the reception unit 207 receives print setting information on a first print job transmitted from the external device 201. At step S402, the analysis unit 209 analyzes the print setting information on the first print job and acquires information relating to the print settings of the first print job. At this step, the information similar to that at step S302 in FIG. 3 is acquired. At step S403, the printer engine 206 starts printing of the first print job. It may also be possible to start the processing at S404 by skipping S403. At step S404, the reception unit 207 receives print setting information on a second print job. At step S405, the analysis unit 209 analyzes the print setting information on the second print job and acquires information relating to the print settings of the second print job. At this step, the information similar to that at step S302 in FIG. 3 is acquired. At step S406, the print job management unit 208 performs printing determination processing to determine whether continuous printing of the first print job and the second print job is possible. In the case where the results of the determination are affirmative, the processing advances to step S407. On the other hand, in the case where the results of the determination are negative, the processing advances to step S411. Details of step S406 will be described later by using FIG. 5. The continuous printing refers to the printing operation to perform printing continuously for a plurality of printing media without suspending feed and conveyance of printing media. In other words, the continuous printing refers to the printing operation to feed a printing medium for which printing is performed after a certain printing medium (preceding printing medium) to the conveyance path before discharge of the preceding printing medium is completed. In the case where the continuous printing is performed for each job, before discharge of all the sheets for which printing has been performed based on a job (preceding job) is completed, sheets for which printing is performed based on a job that is processed after the preceding job are fed to the conveyance path.

In the following, the case where it is determined that continuous printing is possible at step S406 is explained. The control unit 203 instructs the external device 201 to transmit the print data of the second print job before S409. At step S407, the print job management unit 208 performs blank sheet insertion-related processing. The blank sheet insertion-related processing is processing to determine whether to insert a blank page between the last page of the first print job and the first page of the second print job and to perform control so as to insert a blank page based on the results of the determination. Details of step S407 will be described later by using FIG. 6. At step S408, the print job management unit 208 gives instructions to feed additional sheets in the number necessary for the continuous printing of the first print jog and the second print job via the command generation unit 214. In accordance of the instructions, the printer engine 206 feeds sheets in the number necessary for the printing of both the first print job and the second print job. At step S409, the printer engine 206 performs printing of the second print job continuously following the first print job. At this time, the printer engine 206 does not suspend. At step S410, the print job management unit 208 completes the first print job and the second print job. At this step, in the case where all the pages are discharged to the sheet discharge tray 111 for each of the first print job and the second print job, the first print job and the second print job are completed.

In the following, the case where it is determined that continuous printing is not possible at step S406 is explained. At step S411, the print job management unit 208 completes the first print job. At step S412, the print job management unit 208 suspends the printer engine 206. At step S413, the printer engine 206 starts printing of the second print job and after all the pages of the second print job are discharged to the sheet discharge tray 111, at step S414, the print job management unit 208 completes the second print job.

(About Processing to Determine Whether Continuous Printing is Possible)

Figures 5, 5A:
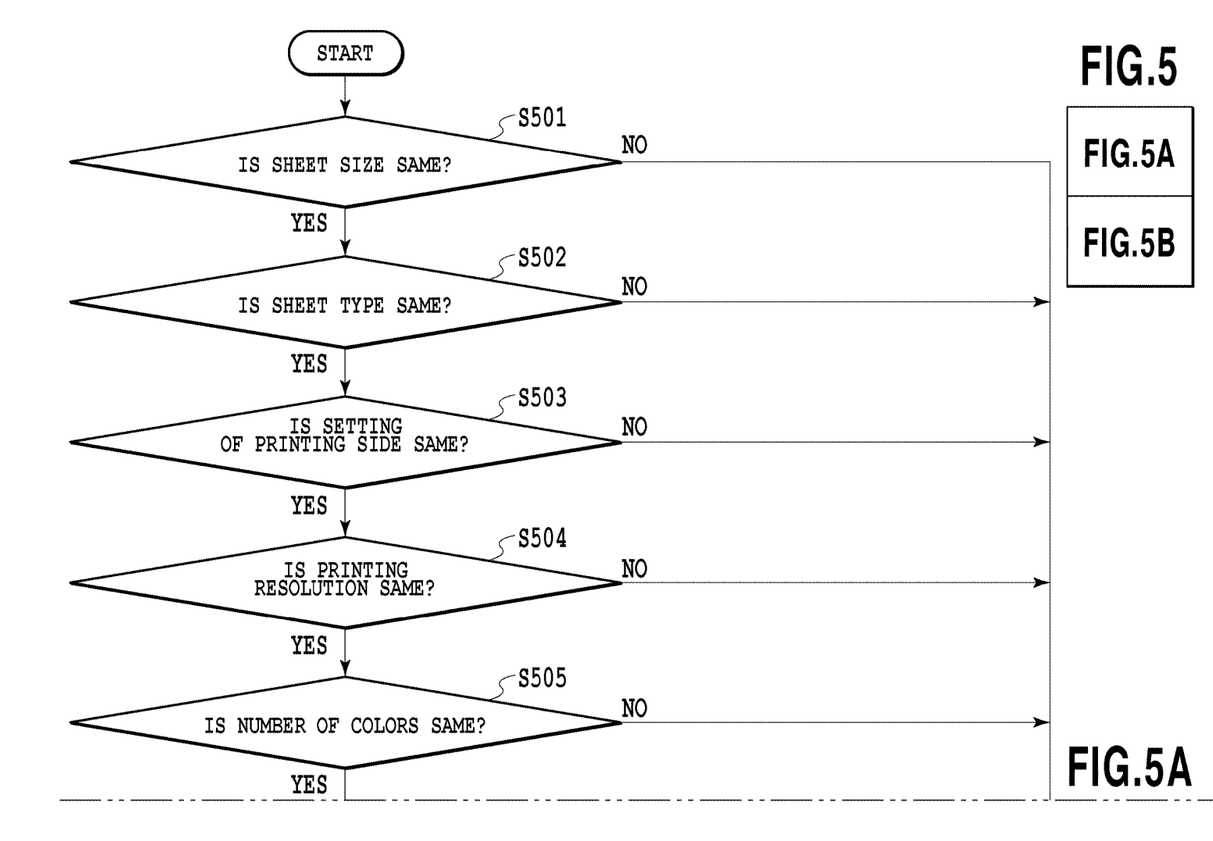
Figure 5B:
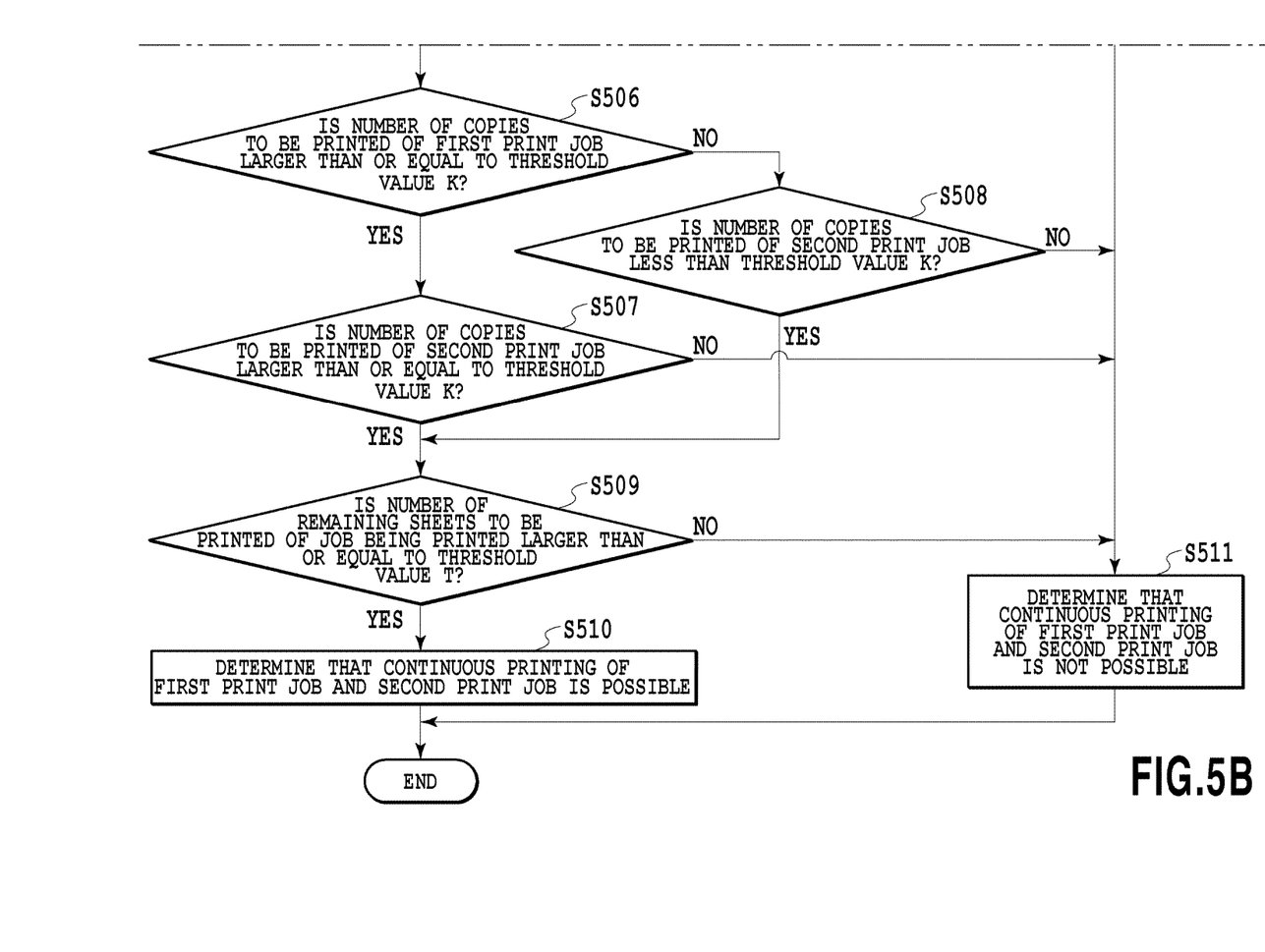

FIG. 5 is a detailed flowchart of the processing at step S406 in FIG. 4. The print job management unit 208 has received the print setting information on the first print job and the print setting information on the second print job from the external device and by using the information, the processing to be explained below will be enabled. At step S501, the print job management unit 208 determines whether the sheet size in the first print job and the sheet size in the second print job are the same. In the case where the results of the determination are affirmative, the processing advances to step S502. On the other hand, in the case where the results of the determination are negative, the processing advances to step S511. At step S502, the print job management unit 208 determines whether the sheet type in the first print job and the sheet type in the second print job are the same. In the case where the results of the determination are affirmative, the processing advances to step S503. On the other hand, in the case where the results of the determination are negative, the processing advances to step S511. At step S503, the print job management unit 208 determines whether the setting of the printing side (i.e., one-side printing or both-side printing) in the first print job and the setting of the printing side in the second print job are the same. In the case where the results of the determination are affirmative, the processing advances to step S504. On the other hand, in the case where the results of the determination are negative, the processing advances to step S511. At step S504, the print job management unit 208 determines whether the printing resolution in the first print job and the printing resolution in the second print job are the same. In the case where the results of the determination are affirmative, the processing advances to step S505. On the other hand, in the case where the results of the determination are negative, the processing advances to step S511. It is assumed that the image forming apparatus 100 in the present embodiment is capable of printing with printing resolutions of 300 dpi, 600 dpi, 1200 dpi and the like. At step S505, the print job management unit 208 determines whether the number of colors used for the first print job and the number of colors used for the second print job are the same. In the case where the results of the determination are affirmative, the processing advances to step S506. On the other hand, in the case where the results of the determination are negative, the processing advances to step S511. As the number of colors, for example, four of C, M, Y, and K colors, or seven of C, M, Y, K, LC, LM, and G colors is considered.

At step S506, the print job management unit 208 determines whether the number of copies to be printed of the first print job is larger than or equal to a threshold value K. In the case where the results of the determination are affirmative, the processing advances to step S507. On the other hand, in the case where the results of the determination are negative, the processing advances to step S508. At step S507, the print job management unit 208 determines whether the number of copies to be printed of the second print job is larger than or equal to the threshold value K. In the case where the results of the determination are affirmative, the processing advances to step S509. On the other hand, in the case where the results of the determination are negative, the processing advances to step S511. At step S508, the print job management unit 208 determines whether the number of copies to be printed of the second print job is less than the threshold value K. In the case where the results of the determination are affirmative, the processing advances to step S509. On the other hand, in the case where the results of the determination are negative, the processing advances to step S511.

In the following, the reason that the relationship in magnitude between the number of copies to be printed of the print job and the threshold value K is determined at step S506 to step S508 is explained.

The image forming apparatus 100 conveys a sheet at different conveyance speeds between the case where the number of copies to be printed is larger than or equal to the threshold value K and the case where the number of copies to be printed is less than the threshold value K. As an example, the image forming apparatus 100 of the present embodiment sets the sheet conveyance speed to a first conveyance speed in the case where the number of copies to be printed is one to three, and sets the sheet conveyance speed to a second conveyance speed higher than the first conveyance speed in the case where the number of copies to be printed is four or more. Because of this, the threshold value K is set to "4".

Here, the reason that the image forming apparatus 100 of the present embodiment changes the sheet conveyance speed in accordance with the number of copies to be printed is described below. The data size of the image data whose resolution is set to 1200 dpi is four times that of the image data whose resolution is set to 600 dpi. In the case where it is desired to perform printing of the image data whose resolution is set to 1200 dpi and printing of the image data whose resolution is set to 600 dpi at the same speed, it is necessary for the image processing unit 204 to perform image processing of the image data whose resolution is set to 1200 dpi at a speed four times higher than that of image processing of the image data whose resolution is set to 600 dpi.

For example, the case where one sheet of B2 size is printed in one second is considered. In the case where an image processing unit capable of completing image processing of image data whose resolution is 600 dpi within one second is taken to be a reference, in order to complete image processing of image data whose resolution is 1200 dpi within one second, theoretically, four image processing units are necessary. However, as the number of image processing unit increases, the cost of the image forming apparatus 100 also increases, and therefore, it is not appropriate to increase the number of image processing units immediately.

With the above-described image processing unit being taken to be a reference, which is capable of completing image processing of image data whose resolution is 600 dpi (B2 size) in one second, theoretically, it takes four seconds to complete image processing of image data whose resolution is 1200 dpi (B2 size).

Here, in the case where one page is discharged every second, on a condition that the number of copies to be printed is four or more, at least four or more seconds are necessary for a certain page. In this case, during four seconds during which printing of four copies is performed for a certain page, it is possible to cause the image processing unit 204 to perform image processing of image data whose resolution is 1200 dpi (B2 size).

On the other hand, provided that the number of copies to be printed is three or less (less than four copies), in the case where one page is discharged every second, the printing time necessary for a certain page is three seconds or less. In this case, during three seconds during which printing is performed for a certain page, it is not possible to cause the image processing unit 204 to perform image processing of image data whose resolution is 1200 dpi (B2 size).

In the case where the image processing time of a processing-target page is longer than the printing time of a certain page, the image forming apparatus 100 of the present embodiment adjusts the printing time and the image processing time by reducing the sheet conveyance speed. In more detail, the image forming apparatus 100 of the present embodiment sets the sheet conveyance speed to the first conveyance speed in the case where the number of copies to be printed is one to three and sets the sheet conveyance speed to the second conveyance speed higher than the first conveyance speed in the case where the number of copies to be printed is four or more.

For example, in the case where the number of copies to be printed of the first print job is four and the number of copies to be printed of the second print job is three, the conveyance speed of the first pint job is different from the conveyance speed of the second print job. It is not possible to convey the sheet related to the two print jobs whose conveyance speeds are different such as above on the same conveyance path. Because of this, it is necessary to take into consideration the number of copies set in the print job, the determination at S506 to S508 is performed. In the case where the results of the determination are Yes both at S506 and at S507, the conveyance speed of the first print job and that of the second print job are the same. Consequently, the processing advances to S509. Further, in the case where the results of the determination are No both at S506 and at S507, the conveyance speed of the first print job and that of the second print job are the same. Consequently, the processing advances to S509. On the other hand, in the case where the results of the determination are Yes at S506 and No at S507, or in the case where the results of the determination are No at S506 and Yes at S507, the conveyance speed of the first print job is different from that of the second print job. Because of this, it is determined that continuous printing is not possible. The control of the conveyance speed depending on the number of copies is performed in the case where 1200 dpi is set and in the case where 600 dpi or lower is set, it may also be possible not to perform the control of the conveyance speed. In this case, on a condition that it is determined that the resolution is 600 dpi or lower at S504, S506 to S508 may be omitted.

Further, explanation is given to the aspect in which in the case where 1200 dpi is set, the image forming apparatus 100 of the present embodiment uses the results of the image processing for each page performed for the first copy also for printing of another copy irrespective of the number of copies, but another aspect may be accepted. For example, in the case where copies in a predetermined number or more are printed with a resolution of 1200 dpi, the image forming apparatus 100 performs image processing for each page, but does not perform image processing for each copy and uses the print data created in the image processing for one copy also for printing of another copy. On the other hand, in the case where copies in a number less than the predetermined number are printed with a resolution of 1200 dpi, it may also be possible to perform image processing for each page and for each copy.

Explanation is returned to the flow in FIG. 5. At step S509, the print job management unit 208 determines whether the number of remaining sheets to be printed is larger than or equal to a threshold value T for the first print job being printed. In the present embodiment, the number equal to the number of sheets already fed from the sheet feed tray 101 of the number of remaining sheets to be printed relating to the first print job is set as the threshold value T. For example, it is supposed that 100 sheets are necessary for printing of the first print job and printing of 50 sheets has already been completed. Then, it is supposed that 15 sheets of the remaining 50 sheets have already been fed from the sheet feed tray 101 to the conveyance path. In this case, the threshold value T is 15. In this case, the number of sheets remaining in the sheet feed tray 101 to be used for the processing of the first print job is 35, and therefore, Yes is determined at S609. It may also be possible to set the threshold value T by another method. For example, it may also be possible to calculate in advance the number of remaining sheets necessary to perform continuous printing and to set the calculation results as the threshold value T. In the case where the results of the determination at step S509 are affirmative, the processing advances to step S510. On the other hand, in the case where the results of the determination are negative, the processing advances to step S511. In the following, the reason that the relationship in magnitude between the number of remaining sheets of the first print job and the threshold value T is determined at step S509 is explained. The image forming apparatus 100 has already started sheet feed for the first print job at the point in time at step S509, and therefore, a case is supposed where continuous printing is not possible depending on the sheet feed situation of the first print job. Consequently, it is necessary to determine whether continuous printing is possible based on the sheet feed situation of the first print job. In the present embodiment, in the case where the number of remaining sheets to be printed of the first print job is larger than or equal to the threshold value T, the sheet feed for the first print job is performed continuously, and therefore, it is determined that there is still time to give instructions to feed additional sheets to the printer engine 206. On the other hand, in the case where the number of remaining sheets to be printed of the first print job is less than the threshold value T, there is a possibility that the sheet feed relating to the first print job has already been completed, and therefore, it is determined that it is too late to give instructions to feed addition sheets to the printer engine 206. The threshold value used at step S509 is not limited to the number of sheets already fed and it may also be possible to use another value that indicates that there is still time to give instructions to feed additional sheets to the printer engine 206.

At step S510, the print job management unit 208 determines that the continuous printing of the first print job and the second print job is possible. At step S511, the print job management unit 208 determines that the continuous printing of the first print job and the second print job is not possible.

In the present embodiment, the determination of whether continuous printing is possible is performed for each job, but the determination may be performed for each page. The reason is that it is necessary to determine whether continuous printing is possible for each page in the case where the print setting changes for each page even within one print job.

(About Blank Sheet Insertion-Related Processing)

Figure 6:
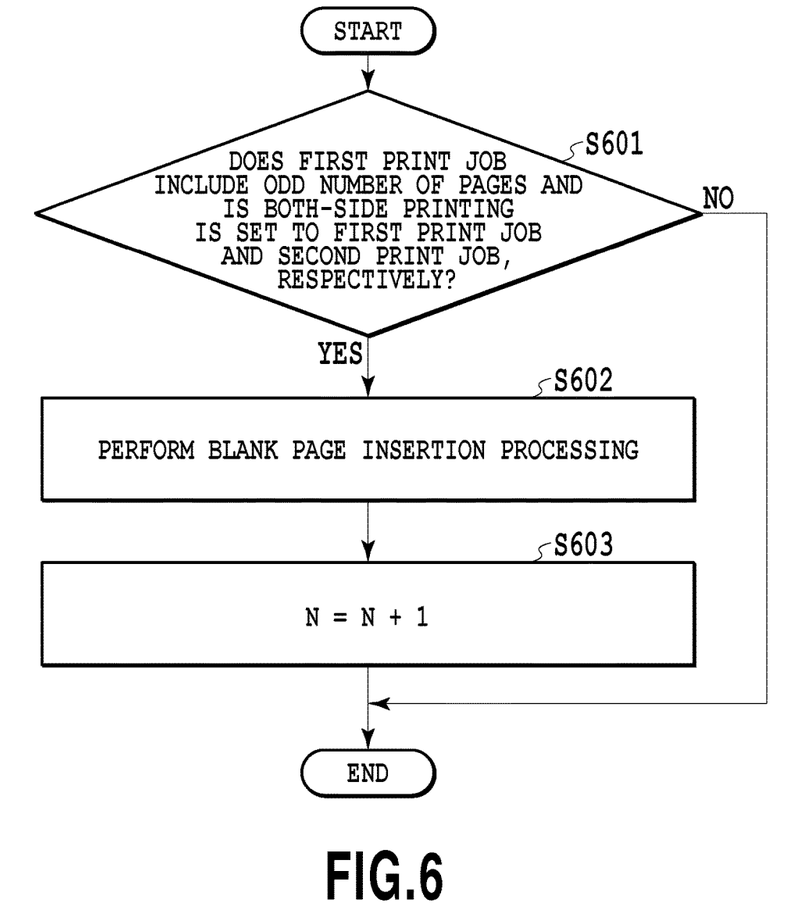
FIG. 6 is a flowchart of processing relating to insertion of a blank page in the first embodiment.

FIG. 6 is a detailed flowchart of the processing at step S407 in FIG. 4. At step S601, the print job management unit 208 determines whether the first print job includes an odd number of pages and both-side printing is set to the first print job and the second print job, respectively. In the case where the results of the determination are affirmative, the processing advances to step S602. On the other hand, in the case where the results of the determination are negative, the series of processing ends. At step S602, the print job management unit 208 controls the image processing unit 204 so as to insert a blank page between the last page of the first print job and the first page of the second print job via the image processing management unit 210. Specifically, the image processing unit 204 adds dummy blank page data to the portion corresponding to the next page of the last page of the first print job stored in the print data transmission unit 223 in accordance with instructions from the image processing management unit 210. Due to this, a blank page is inserted between the first page of the second print job that is received next and the last page of the first print job. Consequently, it will no longer happen that the last page of the first print job is printed on the surface of one sheet and the first page of the second print job is printed on the backside of the same sheet at the time of performing the continuous printing of the first print job and the second print job. Further, it is also possible to prevent a deviation between the surface and the backside of the printed matter of the second print job. In order to keep consistency with the insertion of a blank page performed at step S602, at step S603, the print job management unit 208 adds 1 to the total number of pages N at the time of performing the continuous printing and notifies the printer engine 206 of that.

By the present embodiment, it is made possible to make the side opposite to the last page of the printed matter of the first print job a blank page only in the case where it is necessary at the time of performing the continuous printing of the first print job and the second print job by both-side printing. Further, in the case where the side opposite to the last page of the printed matter of the first print job is made a blank page in the present embodiment, the amount of data capacity that is added on the way of image processing is only the amount corresponding to the page data of the blank page. Because of this, it is possible to suppress resource consumption, such as the amount of used memory, in the control of the image forming apparatus.

Second Embodiment

In the following, explanation of the contents in common to those of the first embodiment is simplified or omitted. In the first embodiment, the insertion of a blank page is implemented by adding blank page data to the print data of the first print job stored in the print data transmission unit 223, but the method of inserting a blank page is not limited to this. For example, it may also be possible to add data indicating that blank page data has been received to the data written to the print data reception unit 221.

Alternatively, in the case where it is possible for the command generation unit 214 to generate a command to insert a blank sheet between any pages, it may also be possible to notify the printer engine 206 of that blank page data is inserted by a command without processing print data. In the case where this method is employed, it is possible to avoid the size of image data to be transmitted to the printer engine 206 by the image processing unit 204 from increasing.

Third Embodiment

In the above-described embodiments, the case where the continuous printing of two print jobs is performed, specifically, the case where the second print job is received during printing of the first print job is explained, but the present invention can be applied also to the case where the continuous printing of three or more print jobs is performed. In the following, explanation is given by supposing a case where the image processing device receives the third print job, the first print job, and the second print job in this order.

Of course, the present invention can also be applied to a case where, for example, before the image forming apparatus 100 prints the first print job, the third print job is being printed, and before the printing of the first print job is started, the second print job is received. Specifically, in the case where the continuous printing of the third print job and the first print job is possible, at step S509, it is sufficient to read the "number of remaining sheets to be printed of the job being printed" as the "number of remaining sheets to be printed of the continuous printing of the third print job and the first print job". On the other hand, in the case where the continuous printing of the third print job and the first print job is not possible, there is enough time before printing of the first print job is started, and therefore, it is sufficient to determine YES at step S509 by regarding T as being 0. It is possible to apply the present embodiment to the first embodiment and the second embodiment.

Other Embodiments

It is also possible to implement the present invention by means of processing in which programs that implement one or more functions of the above-described embodiments are supplied to a system or a device via a network or a storage medium and one or more processors in a computer of the system or the device read and execute the programs. Further, it is also possible to implement the present invention by a circuit (e.g., ASIC) that implements one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible to output printed matter faithfully reflecting the intention of a user in an image forming apparatus capable of continuous printing of print jobs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-107361 filed May 30, 2016, which is hereby incorporated by reference wherein in its entirety.

What is claimed is:

1. An image forming apparatus that forms an image based on print data and print setting information included in a print job, the image forming apparatus comprising:
    at least one memory containing instructions; and
    at least one processor to execute the instructions to operate as:
    a printing determination unit to determine whether or not continuous printing is possible, in which a printing medium to be used for printing of a second print job is fed to a conveyance path before discharge of printed matter of a first print job is completed, based on the first print job and the second print job received after the first print job;
    a determination unit to determine, in a case where it is determined that the continuous printing is possible, whether the first print job includes an odd number of pages and both-side printing is set to the first print job and the second print job, respectively;
    a control unit to perform, in a case where the first print job includes an odd number of pages and both-side printing is set to the first print job and the second print job, respectively, control so as to insert a blank page so that the first page of the second print job is not printed on the opposite side of the last page of the first print job; and
    a conveyance control unit to convey a printing medium at a first conveyance speed in a case where a number of copies to be printed is smaller than a predetermined number, and to convey the printing medium at a second conveyance speed larger than the first conveyance speed in a case where the number of copies to be printed is larger than the predetermined number,
    wherein in a case where the numbers of copies to be printed of the first and second print jobs are smaller than the predetermined number, and a printing medium to be used for the first print job and the printing medium to be used for the second print job are conveyed at the first conveyance speed, or in a case where the numbers of copies to be printed of the first and second print jobs are larger than the predetermined number, and the printing medium to be used for the first print job and the printing medium to be used for the second print job are conveyed at the second conveyance speed, the printing determination unit determines that continuous printing of the first and second print jobs is possible.

2. The image forming apparatus according to claim 1, wherein
    the control unit adds blank page data to a portion corresponding to the next page of the last page of the first print job.

3. The image forming apparatus according to claim 1, wherein
    the printing determination unit determines that continuous printing of the first print job and the second print job is possible in a case where a number of remaining sheets to be printed relating to the first print job is larger than a threshold value.

4. The image forming apparatus according to claim 3, wherein
    the threshold value is equal to a number of printing media already fed to a conveyance path of the number of remaining sheets to be printed relating to the first print job.

5. The image forming apparatus according to claim 1, wherein
    the determination unit determines whether continuous printing of a third print job and the first print job is possible in a case where the third print job is being printed before the image forming apparatus prints the first print job and the second print job is received before printing of the first print job is started, and in a case where results of the determination indicate that continuous printing of the third print job and the first print job is possible, the determination unit determines whether continuous printing of the third print job, the first print job, and the second print job is possible.

6. An image forming method of forming an image based on print data and print setting information included in a print job, the image forming method comprising the steps of:
    determining whether or not continuous printing is possible, in which a printing medium to be used for printing of a second print job is fed to a conveyance path before discharge of printed matter of a first print job is completed, based on the first print job and the second print job received after the first print job;

determining, in a case where it is determined that the continuous printing is possible, whether the first print job includes an odd number of pages and both-side printing is set to the first print job and the second print job, respectively;

performing, in a case where the first print job includes an odd number of pages and both-side printing is set to the first print job and the second print job, respectively, control so as to insert a blank page so that the first page of the second print job is not printed on the opposite side of the last page of the first print job; and conveying a printing medium at a first conveyance speed in a case where a number of copies to be printed is smaller than a predetermined number, and to convey the printing medium at a second conveyance speed larger than the first conveyance speed in a case where the number of copies to be printed is larger than the predetermined number, wherein in a case where the numbers of copies to be printed of the first and second print jobs are smaller than the predetermined number, and a printing medium to be used for the first print job and the printing medium to be used for the second print job are conveyed at the first conveyance speed, or in a case where the numbers of copies to be printed of the first and second print jobs are larger than the predetermined number, and the printing medium to be used for the first print job and the printing medium to be used for the second print job are conveyed at the second conveyance speed, it is determined that continuous printing of the first and second print jobs is possible.

7. The image forming method according to claim 6, wherein
blank page data is added to a portion corresponding to the next page of the last page of the first print job.

8. The image forming method according to claim 6, wherein
it is determined that continuous printing of the first print job and the second print job is possible in a case where a number of remaining sheets to be printed relating to the first print job is larger than a threshold value.

9. The image forming method according to claim 8, wherein
the threshold value is equal to a number of printing media already fed to a conveyance path of the number of remaining sheets to be printed relating to the first print job.

10. The image forming method according to claim 6, wherein
whether continuous printing of a third print job and the first print job is possible is determined in a case where the third print job is being printed before the image forming apparatus prints the first print job and the second print job is received before printing of the first print job is started, and in case where results of the determination indicate that continuous printing of the third print job and the first print job is possible, whether continuous printing of the third print job, the first print job, and the second print job is possible is determined.

11. A non-transitory computer readable storage medium storing a program for causing a computer to perform an image forming method of forming an image based on print data and print setting information included in a print job, the image forming method comprising the steps of:

determining whether or not continuous printing is possible, in which a printing medium to be used for printing of a second print job is fed to a conveyance path before discharge of printed matter of a first print job is completed, based on the first print job and the second print job received after the first print job;

determining, in a case where it is determined that the continuous printing is possible, whether the first print job includes an odd number of pages and both-side printing is set to the first print job and the second print job, respectively;

performing, in a case where the first print job includes an odd number of pages and both-side printing is set to the first print job and the second print job, respectively, control so as to insert a blank page so that the first page of the second print job is not printed on the opposite side of the last page of the first print job; and conveying a printing medium at a first conveyance speed in a case where a number of copies to be printed is smaller than a predetermined number, and to convey the printing medium at a second conveyance speed larger than the first conveyance speed in a case where the number of copies to be printed is larger than the predetermined number, wherein in a case where the numbers of copies to be printed of the first and second print jobs are smaller than the predetermined number, and a printing medium to be used for the first print job and the printing medium to be used for the second print job are conveyed at the first conveyance speed, or in a case where the numbers of copies to be printed of the first and second print jobs are larger than the predetermined number, and the printing medium to be used for the first print job and the printing medium to be used for the second print job are conveyed at the second conveyance speed, it is determined that continuous printing of the first and second print jobs is possible.

12. The storage medium according to claim 11, wherein
blank page data is added to a portion corresponding to the next page of the last page of the first print job.

13. The storage medium according to claim 11, wherein
it is determined that continuous printing of the first print job and the second print job is possible in a case where a number of remaining sheets to be printed relating to the first print job is larger than a threshold value.

14. The storage medium according to claim 13, wherein
the threshold value is equal to a number of printing media already fed to a conveyance path of the number of remaining sheets to be printed relating to the first print job.

15. The storage medium according to claim 11, wherein
whether continuous printing of a third print job and the first print job is possible is determined in a case where the third print job is being printed before the image forming apparatus prints the first print job and the second print job is received before printing of the first print job is started, and in case where results of the determination indicate that continuous printing of the third print job and the first print job is possible, whether continuous printing of the third print job, the first print job, and the second print job is possible is determined.

* * * * *